US011813985B2

(12) United States Patent
Enno

(10) Patent No.: US 11,813,985 B2
(45) Date of Patent: Nov. 14, 2023

(54) COLLISION AVOIDANCE ASSEMBLY

(71) Applicant: Bradley Enno, Williston, ND (US)

(72) Inventor: Bradley Enno, Williston, ND (US)

(*) Notice: Subject to any disclaimer, the term of this patent is extended or adjusted under 35 U.S.C. 154(b) by 0 days.

(21) Appl. No.: 17/721,044

(22) Filed: Apr. 14, 2022

(65) Prior Publication Data

US 2023/0331151 A1 Oct. 19, 2023

(51) Int. Cl.
*B60Q 9/00* (2006.01)
*B60R 1/25* (2022.01)
*B60R 1/26* (2022.01)
*G01S 13/931* (2020.01)

(52) U.S. Cl.
CPC ............... *B60Q 9/008* (2013.01); *B60R 1/25* (2022.01); *B60R 1/26* (2022.01); *G01S 13/931* (2013.01); *B60R 2300/105* (2013.01); *B60R 2300/301* (2013.01); *B60R 2300/802* (2013.01); *G01S 2013/9315* (2020.01); *G01S 2013/93272* (2020.01); *G01S 2013/93274* (2020.01)

(58) Field of Classification Search
CPC .. B60Q 9/008; B60R 1/25; B60R 1/26; B60R 2300/105; B60R 2300/301; B60R 2300/802; G01S 13/931; G01S 2013/9315; G01S 2013/93272; G01S 2013/93274
See application file for complete search history.

(56) References Cited

U.S. PATENT DOCUMENTS

| 7,457,699 | B2 | 11/2008 | Chia |
| 8,466,806 | B2 | 6/2013 | Schofield |
| 9,493,117 | B2 | 11/2016 | Shehan |
| 9,792,820 | B1 | 10/2017 | Russell, Jr. |
| 2003/0141965 | A1* | 7/2003 | Gunderson ............ B60Q 9/008 348/148 |
| 2017/0001562 | A1* | 1/2017 | Bish ..................... B60W 30/08 |
| 2017/0124881 | A1 | 5/2017 | Whitehead |

FOREIGN PATENT DOCUMENTS

| DE | 102011115421 | | 4/2013 | |
| DE | 102016113118 | A1 * | 2/2017 | ............ B60D 1/605 |

* cited by examiner

*Primary Examiner* — Daryl C Pope
(74) *Attorney, Agent, or Firm* — Jasa Wanskat

(57) ABSTRACT

A collision avoidance assembly for reducing collisions with a semitrailer includes a rear and side facing alert modules, which are mountable to a semitrailer, and a control module, which is mountable in a cab of a semitruck engaged to the semitrailer. Each alert module comprises a sensor, a camera, and a speaker. The sensors detect and the cameras image an approaching vehicle. The speaker and the control module provide audible alerts to a driver of the approaching vehicle and an operator of the semitrailer, respectively, so as to facilitate collision avoidance.

9 Claims, 4 Drawing Sheets

COLLISION AVOIDANCE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle safety assemblies and more particularly pertains to a new vehicle safety assembly for reducing collisions with a semitrailer. The present invention discloses a vehicle safety assembly comprising a rear and side facing alert modules, which are mountable to a semitrailer, and a control module, which is mountable in a cab of a semitruck engaged to the semitrailer. Each alert module comprises a sensor, a camera, and a speaker. The sensors detect and the cameras image an approaching vehicle. The speaker and the control module provide audible alerts to a driver of the approaching vehicle and an operator of the semitrailer, respectively, so as to facilitate collision avoidance.

(2) Description of Related Art Including Information Disclosed Under 37 CFR 1.97 and 1.98

The prior art relates to vehicle safety assemblies. Prior art vehicle safety assemblies may comprise sensors for detecting approaching vehicles a rear end of a semitrailer, and lights and speakers for alerting drivers of the approaching vehicles. What is lacking in the prior art is a vehicle safety assembly comprising a rear and side facing alert modules, which are mountable to a semitrailer, and a control module, which is mountable in a cab of a semitruck engaged to the semitrailer. Each alert module comprises a sensor, a camera, and a speaker. The sensors detect and the cameras image an approaching vehicle. The speaker and the control module provide audible alerts to a driver of the approaching vehicle and an operator of the semitrailer, respectively, so as to facilitate collision avoidance.

BRIEF SUMMARY OF THE INVENTION

An embodiment of the disclosure meets the needs presented above by generally comprising a plurality of alert modules and a control module. The alert modules are configured to be mountable to a frame of a semitrailer. Each alert module comprises a sensor and a camera, which are configured to detect proximity of, and to capture an image of, an approaching vehicle, respectively. The alert module also comprises a first speaker, which is configured to emit a first alert. The control module is configured to be mountable within a cab of a semitruck engaged to the semitrailer so that a screen of the control module is visible to an operator of the semitruck. The control module comprises a second speaker, which is configured to emit a second alert. The control module is communicatively engaged to the plurality of alert modules. The sensor is configured to detect the approaching vehicle and to signal the control module. The control module is enabled to actuate the camera and the first speaker to capture the image and to emit the first alert to notify a driver of the approaching vehicle of a potential collision, respectively. The controller also is enabled to actuate the screen and the second speaker to display the image and to emit the second alert to notify the operator of the semitruck of the potential collision, respectively.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
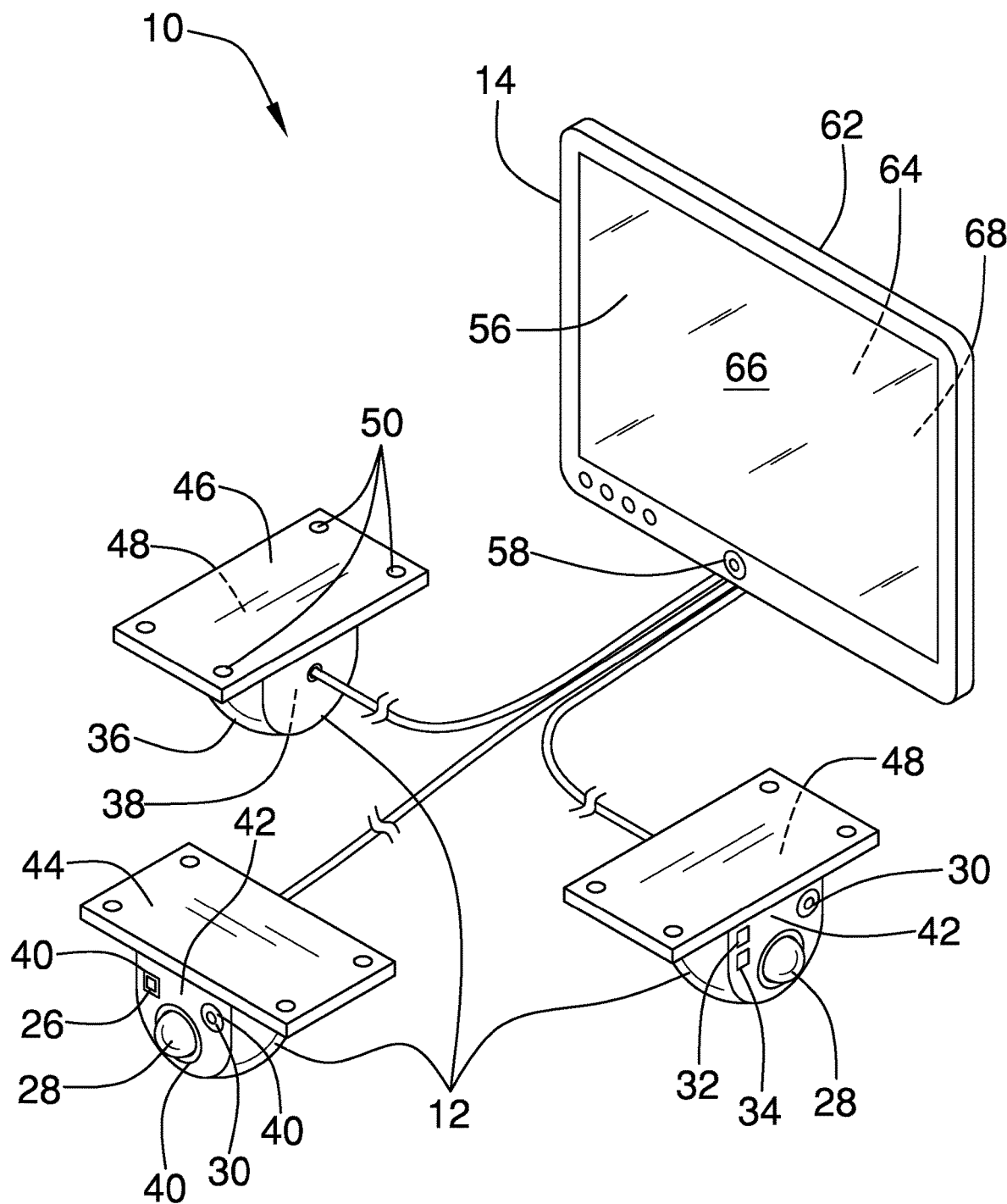
FIG. 1 is an isometric perspective view of a collision avoidance assembly according to an embodiment of the disclosure.
Figure 2:
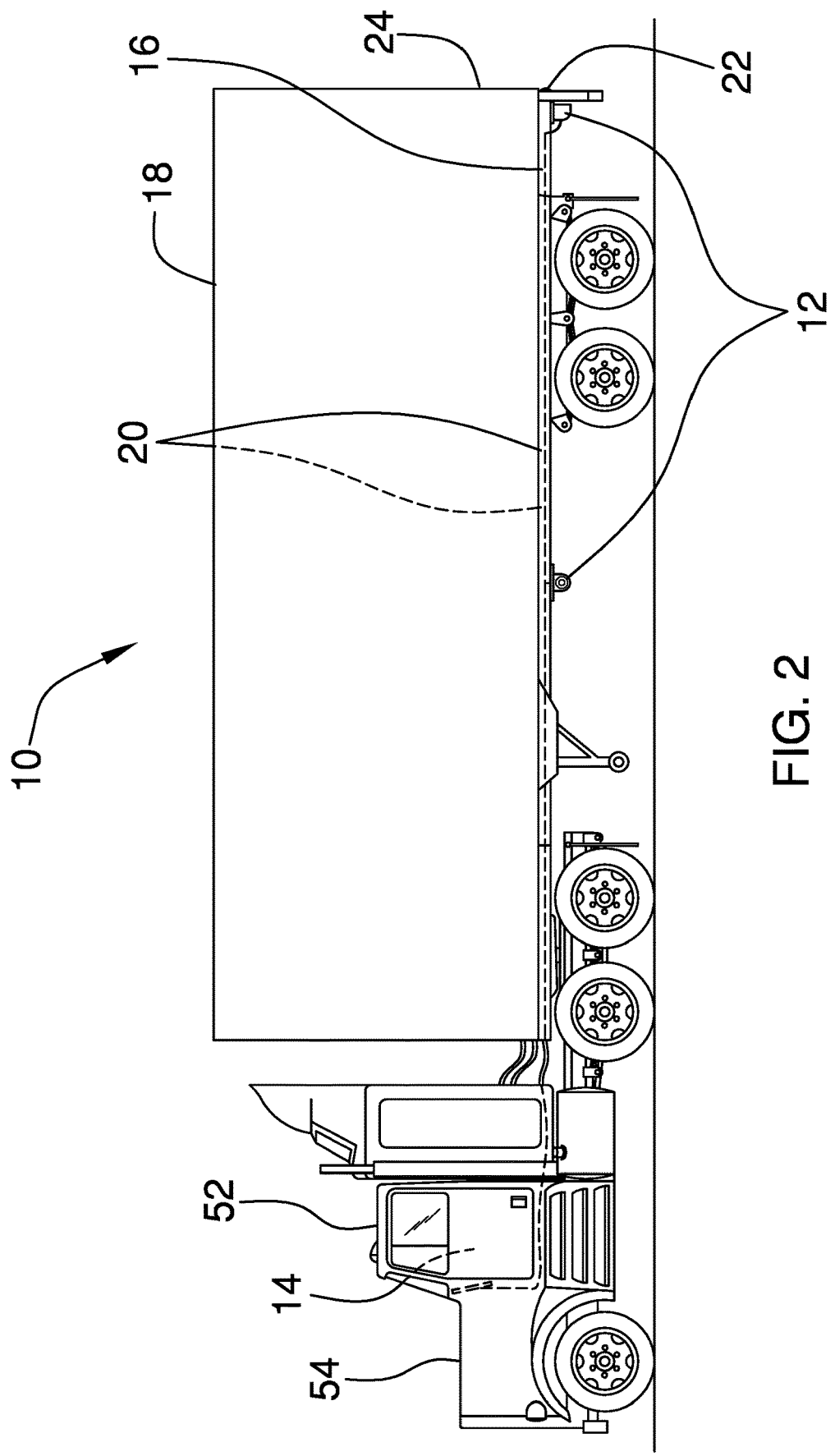
FIG. 2 is a side in-use view of an embodiment of the disclosure.

With reference now to the drawings, and in particular to FIGS. 1 through 4 thereof, a new vehicle safety assembly embodying the principles and concepts of an embodiment of the disclosure and generally designated by the reference numeral 10 will be described.

Figure 3:
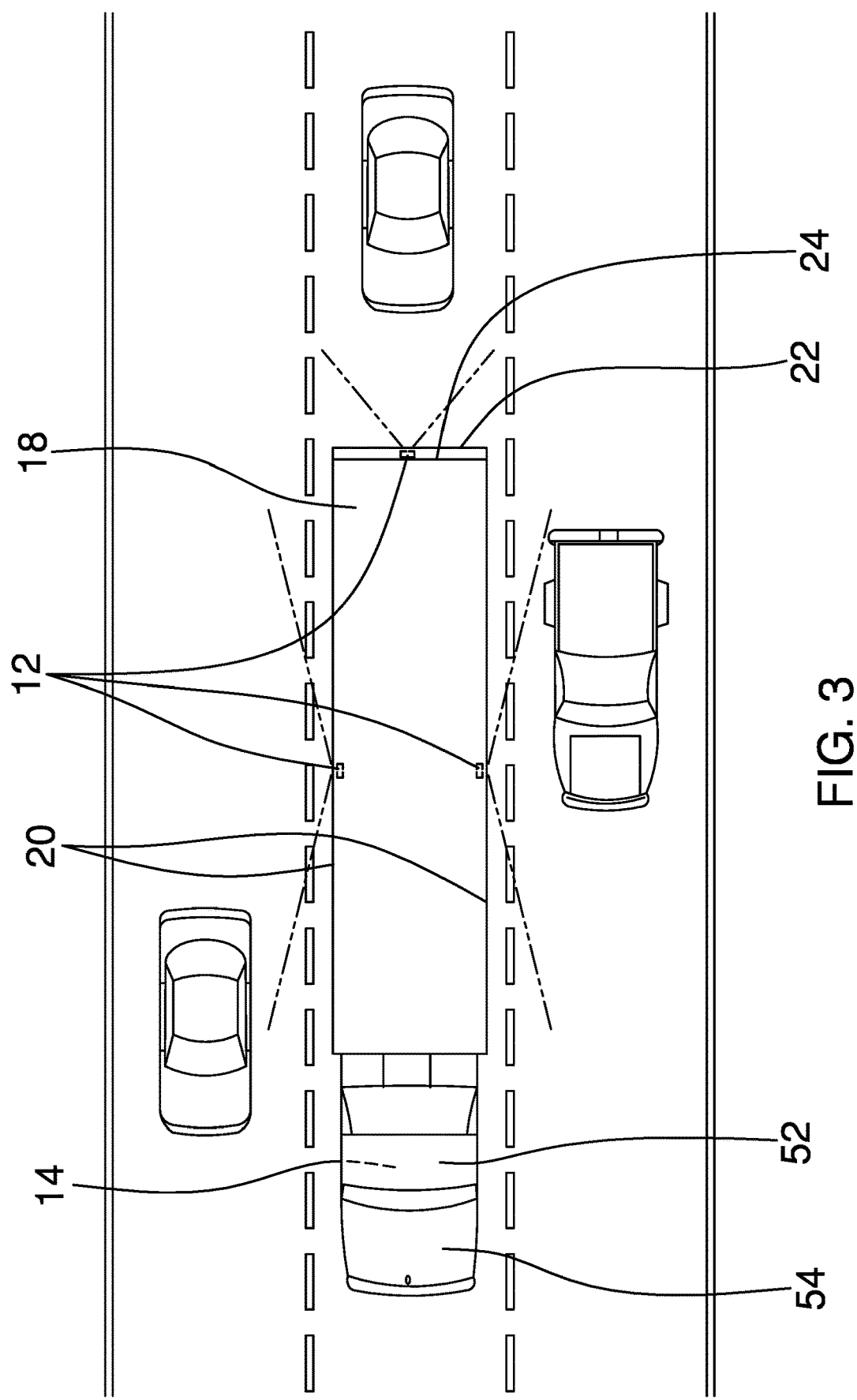
FIG. 3 is a top in-use view of an embodiment of the disclosure.
Figure 4:
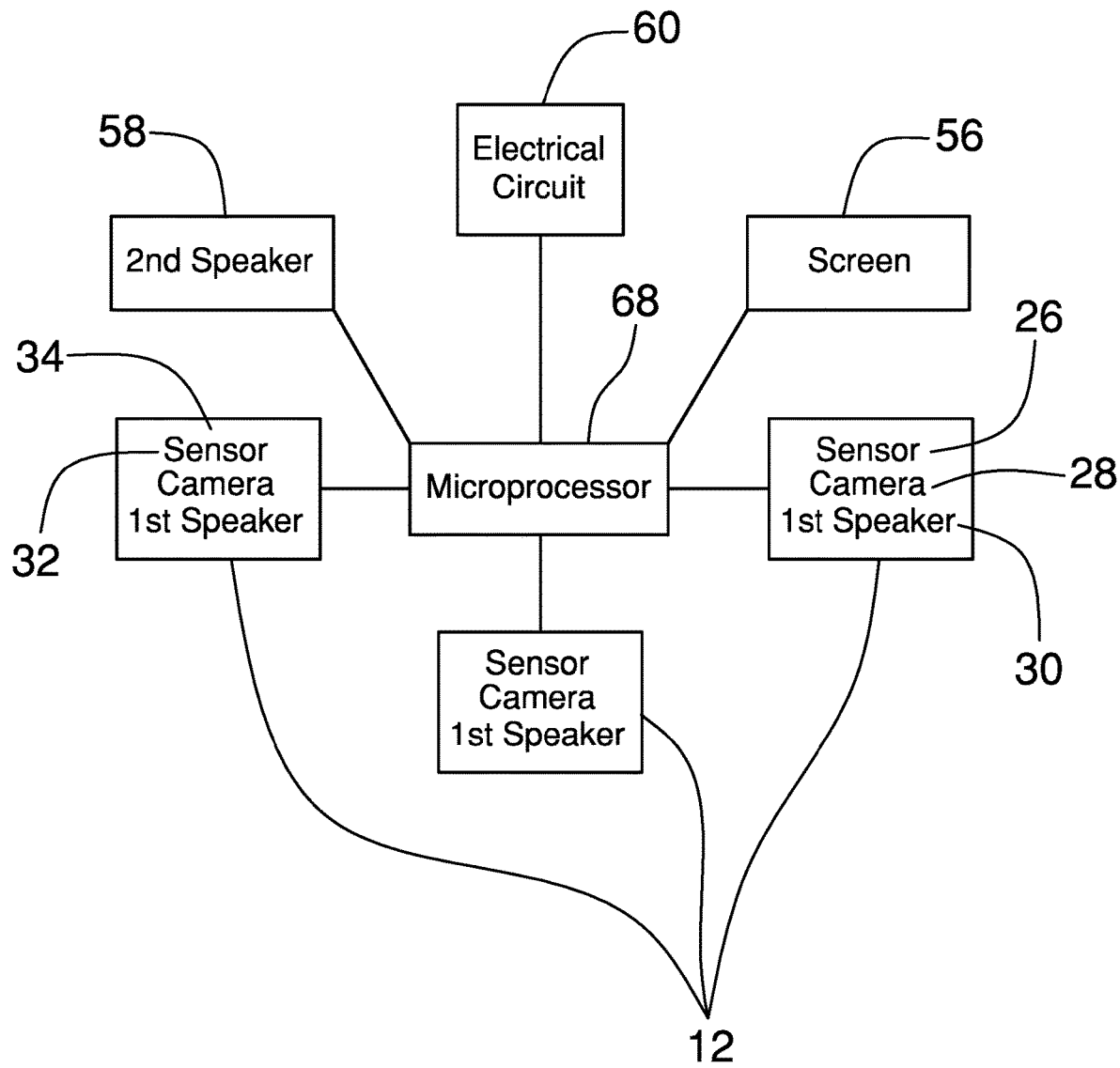
FIG. 4 is a block diagram of an embodiment of the disclosure.

As best illustrated in FIGS. 1 through 4, the collision avoidance assembly 10 generally comprises a plurality of alert modules 12 and a control module 14. The alert modules 12 are configured to be mountable to a frame 16 of a semitrailer 18. The plurality of alert modules 12 may comprise three alert modules 12, as shown in FIG. 3, which are configured to be mounted singly to opposed sides 20 and a rear 22 of the frame 16. This arrangement of alert modules 12 covers blind spots and a rear end 24 of the semitrailer 18.

Each alert module 12 comprises a sensor 26, a camera 28, and a first speaker 30. The sensor 26, which may comprise a radar emitter 32 and a radar detector 34, is configured to detect proximity of an approaching vehicle. The camera 28 is configured to capture an image of the approaching vehicle. The first speaker 30 is configured to emit a first alert. The alert module 12 also may comprise a remote housing 36, which defines an interior space 38. Each of the sensor 26, the camera 28, and the first speaker 30 is engaged to the remote housing 36 and protrudes from an associated aperture 40 positioned in a forward face 42 of the remote housing 36.

A fastener 44 is engaged to the remote housing 36 and is configured to engage the frame 16 so that the remote housing 36 is mounted to the frame 16. The fastener 44 may comprise a plate 46, which is engaged to the remote housing 36, such as to a top face 48 of the remote housing 36, as shown in FIG. 1. A plurality of holes 50 is positioned in the plate 46. Each hole 50 is configured for insertion of a respective article of mounting hardware (not shown) to mount the plate 46 to the frame 16. The present invention also anticipates the fastener 44 comprises other fastening means, such as, but not limited to, magnets, straps, and the like, for removably engaging the remote housing 36 to the frame 16, thereby allowing the plurality of alert modules 12 to be moved from one semitrailer 18 to another.

The control module 14 is configured to be mountable within a cab 52 of a semitruck 54 that is engaged to the semitrailer 18 so that a screen 56 of the control module 14 is visible to an operator of the semitruck 54. The control module 14 comprises a second speaker 58, which is configured to emit a second alert. The control module 14 is communicatively engaged to the plurality of alert modules 12 and is configured to be operationally engaged an electrical circuit 60 of the semitruck 54. As shown in FIG. 1, the alert modules 12 are wiredly engaged to the control module 14 and therefor derive power from the electrical circuit 60. The present also anticipates the alert modules 12 being battery powered and in wireless communication with the control module 14 by means of transceivers (not shown).

The control module 14 also comprises a control housing 62, which defines an internal space 64. The screen 56 is engaged to a front face 66 of the control housing 62. The second speaker 58 is engaged to the control housing 62. A microprocessor 68 is engaged to the control housing 62 and is positioned in the internal space 64. The microprocessor 68 is operationally engaged to the screen 56 and to the second speaker 58.

The sensor 26 is configured to detect the approaching vehicle and to signal the control module 14. The control module 14 is enabled to actuate the camera 28 to capture the image of the approaching vehicle and to actuate the first speaker 30 to emit the first alert to notify a driver of the approaching vehicle of a potential collision. The controller also is enabled to actuate the screen 56 to display the image of the approaching vehicle, as well as the second speaker 58 to emit the second alert, to notify the operator of the semitruck 54 of the potential collision.

In use, the alert modules 12 are mounted to the frame 16 of a semitrailer 18 and the control module 14 is mounted in a cab 52 of a semitruck 54 that is engaged to the semitrailer 18. As an operator of the semitruck 54 tows the semitrailer 18, the operator is alerted by the screen 56 and the second speaker 58 to a vehicle that approaches the frame 16 of the semitrailer 18 from an opposed side 20, as may occur when a driver of a vehicle drifts from their lane, or the rear 22, as may occur when a driver of a vehicle is distracted or asleep. The first speaker 30 emits a first alert to apprise the driver of the vehicle of a potential collision. The collision avoidance assembly 10 also will notify the operator of the semitruck 54 when the semitrailer 18 is approaching a stationary object, which will help the operator to avoid such objects when making turns and when backing up the semitrailer 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collision avoidance assembly comprising:
a plurality of alert modules configured to be mountable to a frame of a semitrailer,
each alert module comprising:
a sensor configured for detecting proximity of an approaching vehicle,
a camera configured for capturing an image of the approaching vehicle, and
a first speaker configured for emitting a first alert; and
a control module configured to be mountable within a cab of a semitruck engaged to the semitrailer, such that a screen of the control module is visible to an operator of the semitruck, the control module comprising a second speaker configured for emitting a second alert, the control module being communicatively engaged to the plurality of alert modules, wherein the sensor is configured for detecting the approaching vehicle and signaling the control module, such that the control module is enabled for actuating the camera and the first speaker for capturing the image and emitting the first alert for notifying a driver of the approaching vehicle of a potential collision, respectively, and for actuating the screen and the second speaker for displaying the image and emitting the second alert for notifying the operator of the semitruck of the potential collision, respectively, the alert module comprising
a remote housing defining an interior space, the remote housing having a forward face, the forward face having a U-shaped edge including a curved lower section extending between parallel outer sections, each of the sensor, the camera, and the first speaker being engaged to the remote housing and protruding from an associated aperture positioned in the forward face of the remote housing, the camera being positioned adjacent to the curved lower section and centered between the parallel outer sections, and a fastener engaged to the remote housing and being configured for engaging the frame, such the remote housing is mounted to the frame.

2. The collision avoidance assembly of claim 1, wherein the plurality of alert modules comprises three alert modules configured to be mounted singly to opposed sides and a rear of the frame.

3. The collision avoidance assembly of claim 1, wherein the sensor comprises a radar emitter and a radar detector.

4. The collision avoidance assembly of claim 1, wherein the fastener comprises:

a plate engaged to the remote housing; and a plurality of holes positioned in the plate, wherein each hole is configured for insertion of a respective article of mounting hardware for mounting the plate to the frame.

5. The collision avoidance assembly of claim 4, wherein the plate is engaged to a top face of the remote housing.

6. The collision avoidance assembly of claim 1, wherein the control module is configured for operationally engaging an electrical circuit of the semitruck.

7. The collision avoidance assembly of claim 1, wherein the control module further comprises:

a control housing defining an internal space, the screen being engaged to a front face of the control housing, the second speaker being engaged to the control housing; and a microprocessor engaged to the control housing and positioned in the internal space, the microprocessor being operationally engaged to the screen and the second speaker.

8. A collision avoidance system comprising:

a semitrailer engaged to a semitruck;

a plurality of alert modules mounted to a frame of the semitrailer, each alert module comprising:

a sensor configured for detecting proximity of an approaching vehicle, a camera configured for capturing an image of the approaching vehicle, a first speaker configured for emitting a first alert, and a remote housing defining an interior space, the remote housing having a forward face, the forward face having a U-shaped edge including a curved lower section extending between parallel outer sections, each of the sensor, the camera, and the first speaker being engaged to the remote housing and protruding from an associated aperture positioned in the forward face of the remote housing, the camera being positioned adjacent to the curved lower section and centered between the parallel outer sections; and a control module mountable within a cab of the semitruck, such that a screen of the control module is visible to an operator of the semitruck, the control module comprising a second speaker configured for emitting a second alert, the control module being communicatively engaged to the plurality of alert modules, wherein the sensor is configured for detecting the approaching vehicle and signaling the control module, such that the control module is enabled for actuating the camera and the first speaker for capturing the image and emitting the first alert for notifying a driver of the approaching vehicle of a potential collision, respectively, and for actuating the screen and the second speaker for displaying the image and emitting the second alert for notifying the operator of the semitruck of the potential collision, respectively.

9. A collision avoidance assembly comprising:

a plurality of alert modules configured to be mountable to a frame of a semitrailer, the plurality of alert modules comprising three alert modules configured to be mounted singly to opposed sides and a rear of the frame, each alert module comprising:

a sensor configured for detecting proximity of an approaching vehicle, the sensor comprising a radar emitter and a radar detector, a camera configured for capturing an image of the approaching vehicle, a first speaker configured for emitting a first alert, a remote housing defining an interior space, the remote housing having a forward face, the forward face having a U-shaped edge including a curved lower section extending between parallel outer sections, each of the sensor, the camera, and the first speaker being engaged to the remote housing and protruding from an associated aperture positioned in the forward face of the remote housing, the camera being positioned adjacent to the curved lower section and centered between the parallel outer sections, and a fastener engaged to the remote housing and being configured for engaging the frame, such the remote housing is mounted to the frame, the fastener comprising:

a plate engaged to the remote housing, the plate being engaged to a top face of the remote housing, and a plurality of holes positioned in the plate, wherein each hole is configured for insertion of a respective article of mounting hardware for mounting the plate to the frame; and a control module configured to be mountable within a cab of a semitruck engaged to the semitrailer, such that a screen of the control module is visible to an operator of the semitruck, the control module comprising a second speaker configured for emitting a second alert, the control module being communicatively engaged to the plurality of alert modules, wherein the sensor is configured for detecting the approaching vehicle and signaling the control module, such that the control module is enabled for actuating the camera and the first speaker for capturing the image and emitting the first alert for notifying a driver of the approaching vehicle of a potential collision, respectively, and for actuating the screen and the second speaker for displaying the image and emitting the second alert for notifying the operator of the semitruck of the potential collision, respectively, the control module being configured for operationally engaging an electrical circuit of the semitruck, the control module comprising:

a control housing defining an internal space, the screen being engaged to a front face of the control housing, the second speaker being engaged to the control housing, and a microprocessor engaged to the control housing and positioned in the internal space, the microprocessor being operationally engaged to the screen and the second speaker.

* * * * *